Sept. 25, 1923.
H. C. FORD
SIGHTING DEVICE
Original Filed June 3, 1918
1,468,712
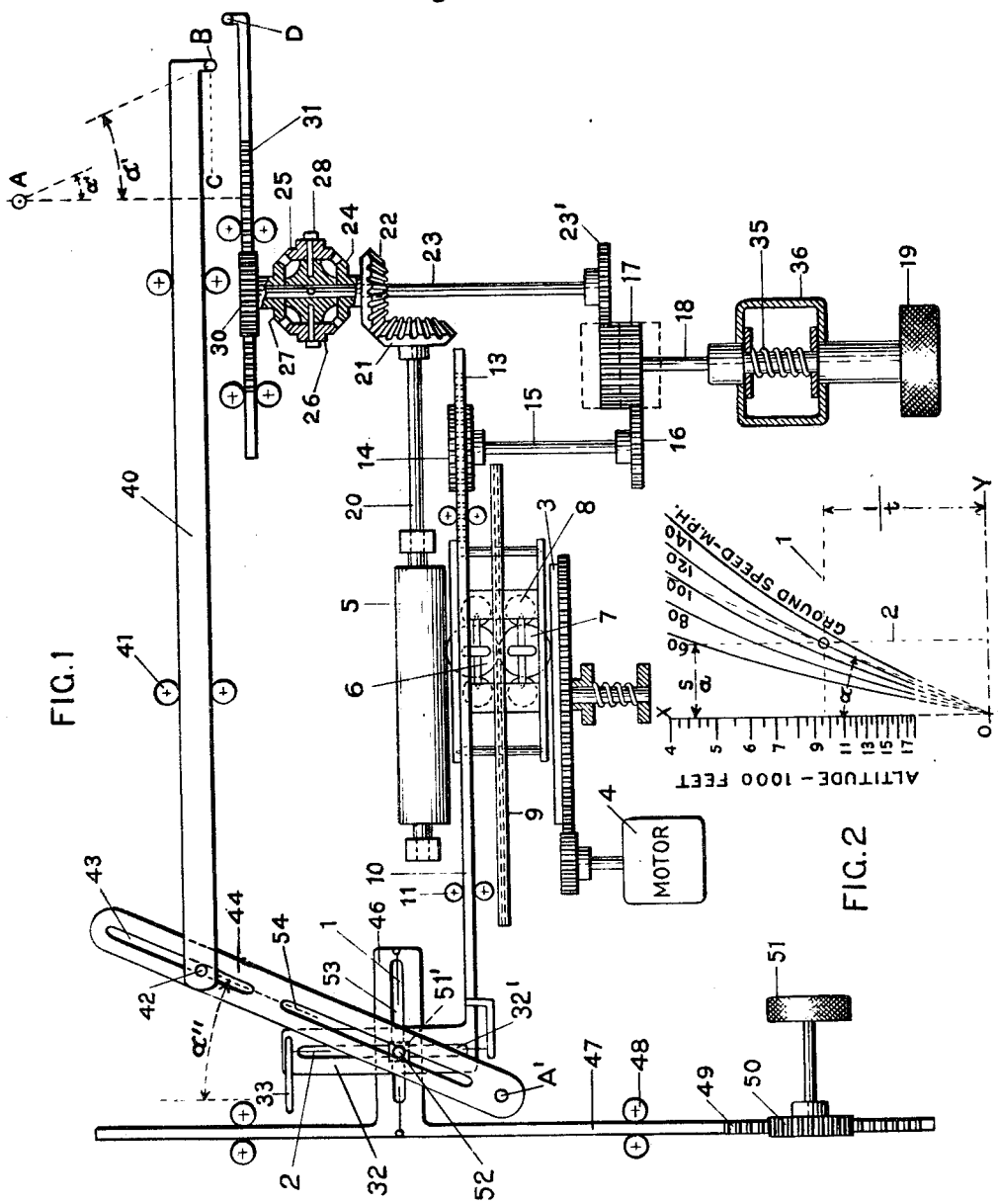
INVENTOR
Hannibal C. Ford
BY Henry Moakley.
ATTORNEY Patented Sept. 25, 1923.

1,468,712

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

SIGHTING DEVICE.

Application filed June 3, 1918, Serial No. 237,900.   Renewed February 25, 1922.   Serial No. 539,288.

*To all whom it may concern:*

Be it known that I, HANNIBAL C. FORD, a citizen of the United States, residing at Jamaica, in the borough of Queens, State of New York, have invented new and useful Improvements in Sighting Devices, of which the following is a specification.

This invention relates to sighting devices. One object of the invention is to provide a speedometer for determining the value of the speed of one object relative to another object when the objects are spaced apart and can not be mechanically connected.

Another object of the invention is to provide in conjunction with the speedometer a predicting device for determining the relative displacements of the two objects during a determined time interval.

Other objects and advantages of the invention will be clear from the description hereinafter to follow when taken in conjunction with the drawings and will be particularly pointed out in the appended claims.

In the drawings one specific embodiment of the invention is shown which is adapted to be used for determining the proper angle for dropping a bomb from an aeroplane and the invention will be described in connection with this embodiment. It is not the intention however, to limit the invention to this particular construction but only by the scope of the claims appended hereto.

In the drawings:—

Fig. 1 is a view somewhat diagrammatic, of a bomb sight in accordance with the principles of the invention and Fig. 2 is a detailed view of the altitude and ground speed scales.

As is well known, in dropping a bomb from an aeroplane sighting devices are used to determine the angle $\alpha$ at which the bomb should be dropped from the aeroplane. If all correction factors for wind, drift, etc. are ignored the tangent of this angle may be represented by the following equation:—$\tan \lambda = \frac{s}{a} t$ where $s$ represents the ground speed, $a$ the altitude and $t$ the time of fall of the bomb.

The time of fall of the bomb or a projectile, is a function of the altitude and may be computed therefrom, and referring to Fig. 2, an altitude scale is shown which is calibrated in terms of the inverse time of fall, i. e. $\frac{1}{t}$ or in other words, an altitude scale shown is calibrated from the point $o$ on the vertical axis $o-x$ for altitude between 4,000 and 15,000 feet with the divisions corresponding to the inverse time of fall for each altitude.

Referring to Fig. 2, a series of curves are plotted which are curves of the ground speed in miles per hour. These curves are plotted with the inverse altitude scale shown in Fig. 2 as ordinates and $\frac{\text{ground speed}}{\text{altitude}}$ or $\frac{s}{a}$ as abscissæ along the axis $o-y$. Therefore the intersection of the movable cross hairs 1 and 2 shown in this view will show upon the curves, the ground speed in miles per hour as for example, the cross hairs 1 and 2 are set for a ground speed of 120 miles per hour which may be changed by moving either of the cross hairs, as for example, if the horizontal cross hair 1 were moved upwardly to a position opposite the division marked 6 as altitude scale the cross hairs would then indicate a ground speed of approximately 80 miles per hour. It will therefore be seen that these cross hairs and scales in conjunction with the actuating mechanism for the cross hairs constitute a speedometer by means of which the ground speed of the aeroplane may be readily determined.

It will also be clear from Fig. 2 that the tangent of the angle between the vertical axis $o-x$ and the line joining the point $o$ and the intersection of the cross wires will be equal to $$\frac{s/a}{1/t} = \frac{s}{a} t$$

or the proper bombing angle if correction factors are ignored.

Referring now to Fig. 1, A is a relatively fixed sight and B is a laterally adjustable sight which is shifted so that the $\angle \alpha'$ or $\angle C-A-B$ is equal to $\angle \alpha$ as shown in Fig. 2. Therefore the bomb should be dropped when sight A, sight B and the target are in alignment and the line A—C is vertical.

The mechanism for shifting the adjustable sight B will now be described, and first referring to the construction whereby the factor $\frac{s}{a}$ is determined. This is accomplished by means of a variable speed mechanism comprising a disk 3 which is driven at a constant speed by motor 4 and a driven member consisting of a cylindrical roller 5, while interposed between the roller and disk and adapted to travel radially across the disk are a pair of balls 6 and 7 which are surrounded by cage 8. These balls constitute the speed varying element of the mechanism and it will be evident that the distance the balls are displaced from the center of the disk determines the speed of rotation of the roller 5 which is therefore directly proportional to the displacement of the balls. The cage 8 surrounding the balls travels in guide ways 9 and has connected to it a bar or slide 10 which is held in position by rollers 11 and carries the vertical cross wire 2 at one end; the other end of this bar or slide carries a rack 13 which meshes with a gear 14 upon a shaft 15. The shaft 15 also carries a gear 16 meshing with a gear 17 upon a shaft 18 which shaft 18 carries a knob 19 which when turned, varies the position of the balls to change the speed of the roller 5. The driven roller 5 is connected to a movable sight D adjacent to the adjustable sight B through a shaft 20, bevel gears 21 and 22. The bevel gear 22 is loosely mounted upon a shaft 23 and is connected to a gear 24 forming with gears 25, 26 and 27, a differential of a well known type, the gears 25 and 26 being connected to a spider 28 fastened to the shaft 23. The gear 27 is loosely mounted upon the shaft 23 and is connected to a gear 30 which actuates the rack 31 which carries the movable sight D. The bar or slide 10 is provided with an offset 32 having arms 33 which carry the vertical cross hair 2 shown in Fig. 2. When the cross hair coincides with the axes of the ordinates or the axes o—x the balls 6 and 7 are directly over the center of the disk 3 and hence the roller 5 will not rotate. As the cross hair moves to the right the roller 5 commences to rotate with a speed which is proportional to the displacement of the cross hair 2 from the axis o—x or as is clear from Fig. 2, equal to $\frac{s}{a}$ and therefore the movement of the movable sight D is directly proportional to the ground speed and inversely proportional to the altitude. It is therefore evident that this part of the apparatus will serve as a speedometer for if the movable sight D is trained upon an object so that the sights A and D and the object upon the ground are in alignment and the operating knob 19 moved until the movement of the sight D is such that it remains in alignment with the sight A and the target, the amount of displacement of the balls 6 and 7 from the center of the disk will give a measure of the quantity $\frac{s}{a}$ and from the chart shown in Fig. 2 this quantity may be read in terms of ground speed alone.

In practice in operating the speedometer the horizontal cross hair 1 is first set to the altitude shown by the barometer, the altitude scale shown in Fig. 2 being used for this purpose. The cross hair 2 is then moved to intersect the cross hair 1 upon the curve corresponding to the estimated ground speed of the aeroplane and the movable sight D is then trained upon the object and its speed is corrected by the knob 19 until it is moving at a speed at which it will remain in alignment with the sight A and the target or object upon the ground. Or in other words, a movement will be generated which will be proportional to the observed relative movement between the aeroplane and the target.

As is evident, from the above, it is necessary to shift the sight D independently of its travel occasioned by the roller 5 to initially train it on the target and this is also accomplished by means of the hand knob 19. If this knob is pressed inwardly the shaft 18 also moving inwardly will disconnect the gear 17 from the gear 16 and drive the shaft 23 directly, which through the gears 25 and 26 of the center of the differential, will drive the gear 27 to shift the sight D laterally and permit it to be sighted upon the object without affecting the variable speed drive. The hand knob may also be utilized to set the rate independently of the movable sight D by pulling out upon the knob 19 which will disconnect the gear 17 from the shaft 23 and through the gears 16 drive the shaft 15 to change the position of the balls independently of the sight. A centralizing device 35 enclosed within a casing 36 returns the gear 17 to its normal position in either case in which position it is in an engagement with both gears 16 and 23'. When the knob is turned under these conditions, the rate $\frac{s}{a}$ will be varied and the sight D is also moved. In practice this is the normal method of operating the device after the sight D has been trained upon the object, for if the sight D starts to lag behind the object upon the ground the hand knob 19 is rotated to again bring it upon the target and the act of bringing the sight D upon the target will also correct the rate $\frac{s}{a}$ set up to increase the speed of movement of the sight D. If the sight again moves ahead of the target the sight is brought back on the target and consequently the rate $\frac{s}{a}$ is automatically found after the sight D has been shifted one or several times to bring it onto the target and the speed may be read from the ground speed curves at the point of intersection of the cross lines 1 and 2.

So far described, the invention consists of a speedometer for determining the speed of one object moving relatively to another object and this part of the device is not limited to the other parts of the invention but may be used alone as a speedometer for aeroplanes or for other purposes where it is desired to determine the relative speed of two relatively moving objects. It may be used when the reverse conditions exist, namely, the target is moving and the point of observation is fixed.

Referring now to the predicting device, as before stated, the proper angle for determining the moment when a bomb should be dropped, is obtained by shifting the adjustable sight B so that $\angle-C-A-B = \angle-\lambda$ or $\tan \lambda = \frac{s}{a}t$. The sight B is carried by a bar 40 which is supported by rollers 41 and has at its end a pin 42 which rides in a slot 43 in a swinging arm 44 which is pivoted at the point A' which corresponds to the point o in Fig. 2. The horizontal cross hair 1 is carried by an extension 46 of a slide 47 supported by rollers 48 and is translated by means of a rack 49 and a gear 50 which is rotated by a knurled head 51. The extension 32 of the bar or slide 10 is provided with a slot 32' in which a block 51' slides freely. This block carries a pin 52, one end of which fits into a slot 53 in the extension 46 and the other end of which rides in a slot 54 in the swinging arm 44.

It will therefore be seen that if the head 51 is rotated to displace the cross hair 1 and the knob 19 rotated to displace the cross hair 2 until they intersect at the proper position as described, the arm 44 will take a position such that $\angle \lambda'' = \angle \lambda'$ if the length of the bar 40 is selected so that when the swinging arm 44 is in its vertical position the sight B is in vertical alignment with the sight A.

In practice the sights A and B may alone be used to determine the moment when the bomb should be dropped which will be when the target and these two sights are in alignment and the bar 40 is horizontal. However, this is not necessary if the movable sight D has been trained upon the target when the rack 31 is horizontal and its rate corrected, since the moment that the three sights A, B, and D come into alignment will give the proper moment for dropping the bomb. The advantage of this construction is that in determining the bombing angle it is essential that the line A—C be vertical which is difficult to obtain frequently due to the swerving of the aeroplane. In the present construction the movable sight is trained upon the target when the rack 31 is horizontal which need only be the case while the sight is being used to make an observation. Then if at the moment of dropping, the aeroplane should not be at an even keel the three sights will give the proper moment to drop the bomb even though the target is not in alignment with these sights at this moment, due to a swerving of the aeroplane.

I claim:

1. In an instrument of the class described, a movable sighting device, variable speed mechanism for driving said sighting device including a driving element actuated at a constant speed and a speed varying element, and manually controlled means for shifting said speed varying element and for simultaneously shifting said movable sighting device.

2. In an instrument of the class described, a movable sighting device, variable speed mechanism for driving said sighting device including a driving member actuated at a constant speed and a speed varying element, and adjustable means for shifting said speed varying element and for simultaneously shifting said movable sighting device or for shifting said sighting device or speed varying element independently of each other.

3. In a speedometer for aeroplanes, a movable sighting device, means for moving said sighting device at a speed directly proportional to the ground speed of the aeroplane and inversely proportional to the altitude of the aeroplane and means for indicating the ground speed of the aeroplane.

4. In a speedometer for aeroplanes, a movable sighting device, means for automatically driving said movable sighting device at a speed directly proportional to the ground speed of the aeroplane and inversely proportional to the altitude of the aeroplane and a speed indicating mechanism associated with said driving means.

5. In a speedometer for aeroplanes, a sighting device, means for driving said sighting device to maintain it trained upon an object moving relatively to said sighting device including a variable speed mechanism having a constant speed driving element and a speed varying element and speed indicating means connected to said speed varying element.

6. In a speedometer for aeroplanes, a movable sighting device, a driving mechanism for maintaining said sighting device trained upon an object on the ground, including a constant speed driving element and a speed varying element having a displacement directly proportional to the ground speed of the aeroplane and inversely proportional to the altitude of the aeroplane.

7. In an instrument of the class described, a movable sight, means for moving said sight at a speed to maintain it trained upon an object moving relatively to said sight, a prediction sight and means associated with the driving means of said first named sight for setting said second named sight.

8. In an instrument of the class described, a sighting device, and means connected thereto for setting said sighting device to the bombing angle comprising a second sighting device for determining the ground speed of the aeroplane.

9. In an instrument of the class described, a part having a movement proportional to the quotient of the ground speed divided by the altitude, a part movable at right angles thereto having a displacement proportional to the inverse time of the fall of a bomb and a swinging member actuated by both of said parts having an angular displacement whose tangent is the quotient of the displacement of the first of said parts divided by the displacement of the second named of said parts.

10. In an instrument of the class described, a sighting device for determining the bombing angle, a second sighting device for determining the ground speed, and means for setting said first named sighting device simultaneously with said second named sighting device.

11. In an instrument of the class described, a sighting device for determining the bombing angle, a second sighting device for determining the ground speed, and means for setting said first named sighting device simultaneously with said second named sighting device or for setting said second named sighting device independently of said first named sighting device.

12. In an instrument of the class described, means for determining the ground speed of an aeroplane, comprising a movable sighting device and mechanism for driving said sighting device at a speed proportional to the ground speed of the aeroplane to maintain it trained upon an object, means for determining the bombing angle comprising an adjustable sighting device and means for regulating the speed of said movable sighting device and for simultaneously changing the position of said adjustable sighting device.

13. In an instrument of the class described, a movable sighting device, a chart comprising an altitude scale and graphs representing ground speed, a movable part, means for displacing said part proportional to the height of the aeroplane as indicated on said altitude scale, a second movable part, means for moving said second named part to intersect said first named part upon the chart and means for moving said sighting device proportional to the displacement of said second named movable part.

14. In an instrument of the class described, a movable sighting device and means for moving said sighting device at a speed directly proportional to the relative speed between the point of observation and the target and inversely proportional to the altitude.

15. In an instrument of the class described, a movable sighting device and a variable speed mechanism for driving said sighting device at a speed directly proportional to the relative speed between the point of observation and the target and inversely proportional to a factor of the distance between the point of observation and the target.

16. In an instrument of the class described, a sighting device having mechanism for determining the actual rate of movement between two relatively moving objects and a prediction device connected to said sighting device for determining the relative displacement of said objects during a determined time interval.

17. In an instrument of the class described, a sighting device having mechanism for determining the actual rate of movement between two relatively moving objects having a part whose displacement is proportional to the rate of movement, a second part acting as a prediction device having a displacement proportional to a time interval and mechanism associated with said parts for determining the relative displacement of said objects during the time interval.

18. In an instrument of the class described, a sighting device comprising a variable speed mechanism having a part whose displacement is proportional to a rate of movement between two relatively moving objects, and a prediction device connected to said part and having a second part whose displacement is proportional to a time interval and mechanism associated with said parts for determining the relative displacement of said objects during the time interval.

19. In an instrument of the class described, a movable sighting device, variable speed mechanism, connections between said sighting device and said variable speed mechanism and a member connected to said variable speed mechanism having a displacement proportional to the rate of movement between the sighting device and a target moving relatively thereto when the sighting device is maintained trained upon the target.

20. In an instrument of the class described, a movable sighting device, means for automatically moving said sighting device to maintain it trained upon a target moving relatively thereto, and means having a part associated with the moving means for indicating the actual rate of movement between the sighting device and the target.

21. In an instrument of the class described, a movable sighting device, means for moving said sighting device to maintain it trained upon a target moving relatively thereto and means for indicating on a graph the rate of movement between the said sighting device and the target.

22. In an instrument of the class described, a variable speed mechanism having a speed varying element, a moving part connected to said variable speed mechanism having a movement proportional to the rate set up on said variable speed mechanism, said moving part being displaced proportionally to the movement between two relatively moving objects and means for manually varying the position of said moving part and for simultaneously changing the rate set up on said variable speed machanism.

23. In an instrument of the class described, a movable sighting device and means for moving said sighting device at a speed directly proportional to the relative speed between two objects and inversely proportional to the distance between them.

24. In an instrument of the class described, a movable member and means for moving said member at a speed directly proportional to the relative speed between two objects and inversely proportional to the distance between them.

25. In an instrument of the class described, a movable member and means for moving said member in accordance with a direct function of the relative speed between two objects and an inverse function of the distance between the objects.

26. In an instrument of the class described, a part having a movement proportional to the quotient of the ground speed divided by the altitude, a part movable at right angles thereto having a displacement proportional to the inverse time of the fall of a bomb and a member actuated by both of said parts having an angular displacement whose tangent is the quotient of the displacement of the first of said parts divided by the displacement of the second named of said parts.

27. In an instrument of the class described, a device adapted to bear a predetermined relation to the line of sight between two relatively moving, distant objects, variable speed mechanism for driving the device and means for simultaneously shifting the device and altering said variable speed mechanism to change the rate of movement of the device.

28. In an instrument of the class described, a variable speed mechanism having a speed varying element, a moving part connected to said variable speed mechanism having a movement proportional to the rate set up on said variable speed mechanism, said moving part being displaced proportionally to the movement between two relatively moving objects and means for varying the position of said moving part and for simultaneously changing the rate set up on said variable speed mechanism.

29. In an instrument of the class described, the combination of means for observing the relative movement between two objects, means for automatically generating a movement proportional to the observed relative movement, and means for automatically correcting the generated movement when it differs from the observed relative movement.

30. In an instrument of the class described, the combination of means for automatically generating a movement proportional to the observed relative motion of a distant object, means for initially setting said generating mechanism to approximate such relative motion and means actuated by the setting means for automatically correcting the generated movement when it differs from the observed movement.

31. In an instrument of the class described, the combination of means by which the relative movement between one object and a distant object may be observed, a movable element, means for automatically generating a movement of the element proportional to the observed relative movement, means for displacing the element when its position differs from that corresponding to the observed position of the distant object and means actuated by the displacing means for changing the rate of movement imparted to the element by the generating means.

32. In an instrument of the class described, the combination of a movable element, means adapted to move the element in accordance with the observed relative movement of a distant object, means for shifting the element when its movement differs from such observed relative movement and means actuated by the shifting means for controlling the moving means to bring the movement of the member into correspondence with such observed relative movement.

33. In an instrument of the class described, the combination of a member adapted to bear a predetermined relation to the line of sight between two relatively moving objects, variable speed mechanism for driving the member, and means operatively related to the member and to the mechanism for simultaneously changing the position of the member and its rate of movement upon departure of the member from such predetermined relation.

34. In an instrument of the class described, a movable member, means for automatically moving said member to maintain it in a predetermined relation to a relatively moving, distant object, and means having a part associated with the moving means for indicating the rate of relative linear movement between the instrument and the object.

35. In a sighting apparatus, the combination of a sighting device adapted to be adjusted manually and kept trained on a relatively moving, distant object, a variable speed mechanism comprising a constant speed driving member, a member driven therefrom and a displaceable speed varying element for controlling the speed of the driven member, and means whereby the speed varying element may be shifted to maintain the speed of the driven member proportional to the speed of the sighting device as the latter is adjusted and trained.

36. In a sighting apparatus, the combination of a sighting device adapted to be adjusted manually and kept trained on a relatively moving, distant object, a variable speed mechanism comprising a constant speed driving member, a member driven therefrom and a displaceable speed varying element for controlling the speed of the driven member, and connections between the sighting device and the variable speed mechanism including a part connected with the speed varying element whereby the latter may be shifted to maintain the speed of the driven member proportional to the speed of the sighting device as the latter is adjusted and trained.

37. In an instrument of the class described, the combination of a movable member adapted to bear a predetermined relation to the line of sight to a relatively moving, distant object, a variable speed driving mechanism for the member including a speed controller, means for setting the speed controller in accordance with the assumed relative speed of the object, means for adjusting the position of the member to agree with the position corresponding to the observed position of the distant object and connections between the setting means and the position adjusting means for automatically adjusting the speed controller with increasing accuracy as the member is adjusted.

38. In an instrument of the class described a part having a movement proportional to the quotient of the speed between two relatively moving objects divided by the distance between them, a part movable at right angles thereto having a displacement proportional to the inverse time required for a projectile to pass from one object to the other and a member actuated by both of the parts having an angular displacement whose tangent is the quotient of the displacement of the first named part divided by the displacement of the second named part.

39. In an instrument of the class described the combination of means for observing the relative movement between two objects, means for automatically generating a movement proportional to the observed relative movement, means for automatically correcting the generated movement when it differs from the observed relative movement, and predicting mechanism operatively related to the observing means and the generating means.

40. In a predicting apparatus, the combination of a sighting device adapted to be adjusted manually and kept trained on a relatively moving, distant object, a variable speed mechanism comprising a constant speed driving member, a member driven therefrom and a displaceable speed varying element for controlling the speed of the driven member, and connections between the sighting device and the variable speed mechanism including a part connected with the speed varying element whereby the latter may be shifted to maintain the speed of the driven member proportional to the speed of the sighting device as the latter is adjusted and trained, a predicting device having a speed element and a time element, means for operating the speed element of the predicting device from the speed varying element, and means for adjusting the time element.

41. In an instrument of the class described the combination of a member adapted to bear a predetermined relation to the line of sight between two relatively moving objects, variable speed mechanism for driving the member, means operatively related to the member and to the mechanism for simultaneously changing the position of the member and its rate of movement upon departure of the member from such predetermined relation, a predicting device having a pair of coacting elements, means for actuating one of the elements in accordance with changes in the rate of movement of the member, and means for independently actuating the other element.

42. In an instrument of the class described, the combination of a member adapted to bear a predetermined relation to the line of sight between two relatively moving objects, variable speed mechanism for driving the member, means operatively related to the member and to the mechanism for simultaneously changing the position of the member and its rate of movement upon departure of the member from such predetermined relation, a predicting device having a pair of coacting elements, means for actuating one of the elements in accordance with changes in the rate of movement of the member, means for independently actuating the other element, and a member actuated jointly by the elements.

43. In an instrument of the class described the combination of a member adapted to bear a predetermined relation to the line of sight between two relatively moving objects, variable speed mechanism for driving the member, means operatively related to the member and to the mechanism for simultaneously changing the position of the member and its rate of movement upon departure of the member from such predetermined relation, a predicting device having a pair of coacting elements, means for actuating one of the elements in accordance with changes in the rate of movement of the member, means for independently actuating the other element, and means actuated jointly by the elements and cooperating with the member.

44. In an instrument of the class described, a movable member adapted to bear a predetermined relation to the line of sight between two relatively moving objects and means for moving said member at a speed directly proportional to the relative speed between the objects and inversely proportional to the distance between them.

45. In an instrument for measuring the speed between two relatively moving, distant objects, the combination of a sighting device adapted to be maintained in a predetermined relation to the line of sight between the objects, a driving element, a driven element, a speed controller operatively related to said elements, means for adjusting the driven element in accordance with the observed position of one of the objects as determined by the sighting device and connections between the adjusting means and the speed controller for initially setting it in accordance with the estimated relative speed of the objects and for resetting it with increasing accuracy as the driven element is maintained in adjustment.

HANNIBAL C. FORD.